(12) United States Patent
Busby

(10) Patent No.: US 10,925,456 B2
(45) Date of Patent: Feb. 23, 2021

(54) HIGH ASPECT RATIO LAYERED SCRUB

(71) Applicant: Bright Box Lab, LLC, Eden Prairie, MN (US)

(72) Inventor: Timothy Paul Busby, Eden Prairie, MN (US)

(73) Assignee: BRIGHT BOX LAB, LLC, Eden Prairie, MN (US)

( * ) Notice: Subject to any disclaimer, the term of this patent is extended or adjusted under 35 U.S.C. 154(b) by 39 days.

(21) Appl. No.: 16/102,051

(22) Filed: Aug. 13, 2018

(65) Prior Publication Data

US 2020/0046194 A1 Feb. 13, 2020

(51) Int. Cl.
*A47L 13/16* (2006.01)
*A47L 17/08* (2006.01)
(Continued)

(52) U.S. Cl.
CPC ............ *A47L 13/16* (2013.01); *A47L 17/08* (2013.01); *B32B 5/18* (2013.01); *B32B 5/24* (2013.01); *B32B 2250/03* (2013.01); *B32B 2262/0292* (2013.01); *B32B 2266/0278* (2013.01); *B32B 2266/06* (2013.01); *B32B 2305/022* (2013.01); *B32B 2307/4023* (2013.01);
(Continued)

(58) Field of Classification Search
CPC . A47L 13/16; A47L 17/08; B32B 5/18; B32B 5/24; B32B 2250/03; B32B 2262/0292; B32B 2266/06; B32B 2305/022; B32B 2307/4023; B32B 2307/728; B32B 2307/73; B32B 2375/00; B32B 2432/00
See application file for complete search history.

(56) References Cited

U.S. PATENT DOCUMENTS

| 3,861,993 A | 1/1975 | Guthrie |
| 4,104,435 A | 8/1978 | Ballesteros |

(Continued)

FOREIGN PATENT DOCUMENTS

| GB | 297437 A | 6/1929 |
| WO | 9622674 A2 | 8/1996 |

OTHER PUBLICATIONS

"Extra Large Eraser Sponges—2X Thicker", ohmyclean.com, Available from: https://ohmyclean.com/, Oh My Clean, 4 pages, Aug. 9, 2018.

(Continued)

*Primary Examiner* — Shay Karls
(74) *Attorney, Agent, or Firm* — Kagan Binder, PLLC

(57) ABSTRACT

A layered scrub having an aspect ratio of between 0.75 and 1.25 is presented, comprising: a) a scrubber layer; b) a sponge layer; optionally c) a rigid boundary layer, which optionally is directly bound to layer c) and/or layer b); and optionally d) a dense sponge layer. In some such embodiments, layers d) and b) are unitary. In some embodiments, the layered scrub has a height of between 5.0 centimeters and 11.0 centimeters and may be generally cubic. In some embodiments, the scrubber layer comprises a non-reticulated hydrophobic polyurethane foam, the sponge layer and/or the dense sponge layer comprises a hydrophilic polyurethane foam, and the rigid boundary layer comprises polyurethane. In some embodiments, dense sponge layer d) bears printed designs or information.

17 Claims, 1 Drawing Sheet

(51) Int. Cl.
  *B32B 5/18* (2006.01)
  *B32B 5/24* (2006.01)
(52) U.S. Cl.
  CPC ..... *B32B 2307/728* (2013.01); *B32B 2307/73* (2013.01); *B32B 2375/00* (2013.01); *B32B 2432/00* (2013.01)

(56) References Cited

U.S. PATENT DOCUMENTS

| | | | |
|---|---|---|---|
| D271,817 S | 12/1983 | Collin | |
| D291,258 S | 8/1987 | Greer, Sr. | |
| D396,907 S | 8/1998 | Donnelly | |
| 5,799,357 A | 9/1998 | Taylor | |
| 6,485,822 B1 | 11/2002 | Osiecki et al. | |
| 6,503,615 B1 | 1/2003 | Horii et al. | |
| D473,027 S | 4/2003 | Pecaut | |
| 6,574,825 B1 | 6/2003 | Boldy | |
| 6,608,118 B2 | 8/2003 | Kosaka et al. | |
| D495,842 S | 9/2004 | Minkley et al. | |
| D506,299 S | 6/2005 | Chumley | |
| D516,762 S | 3/2006 | Young | |
| 7,124,465 B1 | 10/2006 | Kaminstein | |
| 7,169,029 B2 | 1/2007 | Petersen et al. | |
| D548,414 S | 8/2007 | Akin et al. | |
| D556,966 S | 12/2007 | Herbrand et al. | |
| D571,515 S | 6/2008 | Krause et al. | |
| D576,366 S | 9/2008 | Kubes et al. | |
| D588,766 S | 3/2009 | Dunshee et al. | |
| D590,555 S | 4/2009 | Dunshee et al. | |
| 8,077,555 B1* | 12/2011 | Lovato | A47L 13/16 15/244.4 |
| D659,329 S | 5/2012 | Davis | |
| 8,327,493 B2 | 12/2012 | Armaly, Jr. | |
| 8,505,150 B2 | 8/2013 | Armaly, Jr. | |
| D690,892 S | 10/2013 | Krause | |
| 8,629,196 B2 | 1/2014 | Pung et al. | |
| 8,671,503 B2 | 3/2014 | Tuman | |
| D706,488 S | 6/2014 | Forrest | |
| 9,221,152 B2 | 12/2015 | Petersen et al. | |
| 9,226,637 B2* | 1/2016 | Pung | C11D 17/049 |
| D768,947 S | 10/2016 | Mantelli et al. | |
| D797,390 S | 9/2017 | Kawasaki | |
| D800,404 S | 10/2017 | Kawasaki | |
| 2001/0029967 A1* | 10/2001 | McDonough | A47L 13/16 134/6 |
| 2007/0061991 A1 | 3/2007 | Gonzales et al. | |
| 2008/0132438 A1 | 6/2008 | Hoffman et al. | |
| 2009/0124157 A1 | 5/2009 | Garza et al. | |
| 2010/0092746 A1 | 4/2010 | Coant et al. | |
| 2011/0138564 A1 | 6/2011 | Dunshee | |
| 2011/0138565 A1 | 6/2011 | Dunshee | |
| 2012/0087966 A1 | 4/2012 | Haviland | |
| 2012/0231691 A1 | 9/2012 | Peyras-Carratte et al. | |
| 2014/0075699 A1 | 3/2014 | Krause | |
| 2016/0135934 A1 | 5/2016 | Unger et al. | |
| 2016/0213221 A1 | 7/2016 | Krause et al. | |
| 2016/0297061 A1* | 10/2016 | Konkey | A47L 13/04 |
| 2016/0374531 A1 | 12/2016 | Daveloose et al. | |

OTHER PUBLICATIONS

"South Street Designs Magic Eraser Melamime Foam Sponge All Purpose Multi Surface Eco Green Cleaner for Whiteboard, Kitchen, Tile, Walls, Soap Scum, Bathroom, Shoes, Floor", Amazon.com, Available from: https://www.amazon.com/South-Street-Designs-Melamine-Whiteboard/dp/B072M5QFW6, South Street Designs, 7 pages, Aug. 9, 2018.

"Dawn Scrubtastic Thermal Sensitive Scrub Foam Sponge", Amazon.com, Available from: https://www.amazon.com/Dawn-Scrubtastic-Thermal-Sensitive-Sponge/dp/B075SQC39Z, Dawn, 7 pages, Aug. 9, 2018.

"Fruit Shape Soap Bath Sponges Watermelon Strawberry Orange Shapes Tear Free Hypoallergenic Spongefuls", Amazon.com, Available from: https://www.amazon.com/Sponges-Watermelon-Strawberry-Hypoallergenic-Spongefuls/dp/B01MY2P79C, 6 pages, Aug. 9, 2018.

"Heart Shaped Bath Sponges", Amazon.com, Available from: https://www.amazon.com/Rilko-Kids-Heart-Shaped-Sponges/dp/B0017LXXHI, Rilko Kids, 4 pages, Aug. 9, 2018.

SLEK intense fall + Heart cube cut already 25P (melamine sponge), Amazon.com, Available from: https://www.amazon.com/Lek-intense-already-melamine-sponge/dp/B005ZETITK, Lek (LEC), 4 pages, Aug. 9, 2018.

"Orange Shaped Sponge Brush", us.shein.com, Available from: https://us.shein.com/Orange-Shaped-Sponge-Brush-p-457714-cat-1960.html, SHEIN, 2 pages, Aug. 9, 2018.

"Green Sculpture Foam by FloraCraft", Amazon.com, Available from: https://www.unitednow.com/product/3222/green-sculpture-foam-by-floracraft.aspx?item=42650, United Art & Education, 1 page, Aug. 9, 2018.

"Bath & Body Works Green & Yellow Maple Leaf Shower Gel Sponge Topper New!", ebay.com, Available from: https://www.ebay.com/itm/BATH-BODY-WORKS-GREEN-YELLOW-MAPLE-LEAF-SHOWER-GEL-SPONGE-TOPPER-NEW~/162362063139, Bath & Body Works, 3 pages, Aug. 9, 2018.

"All Things Texas, SpongeBob even likes Texas", Pinterest.com, Available from: https://www.pinterest.com/pin/94786767129929082/, Pinterest, 2 pages, Aug. 9, 2018.

* cited by examiner

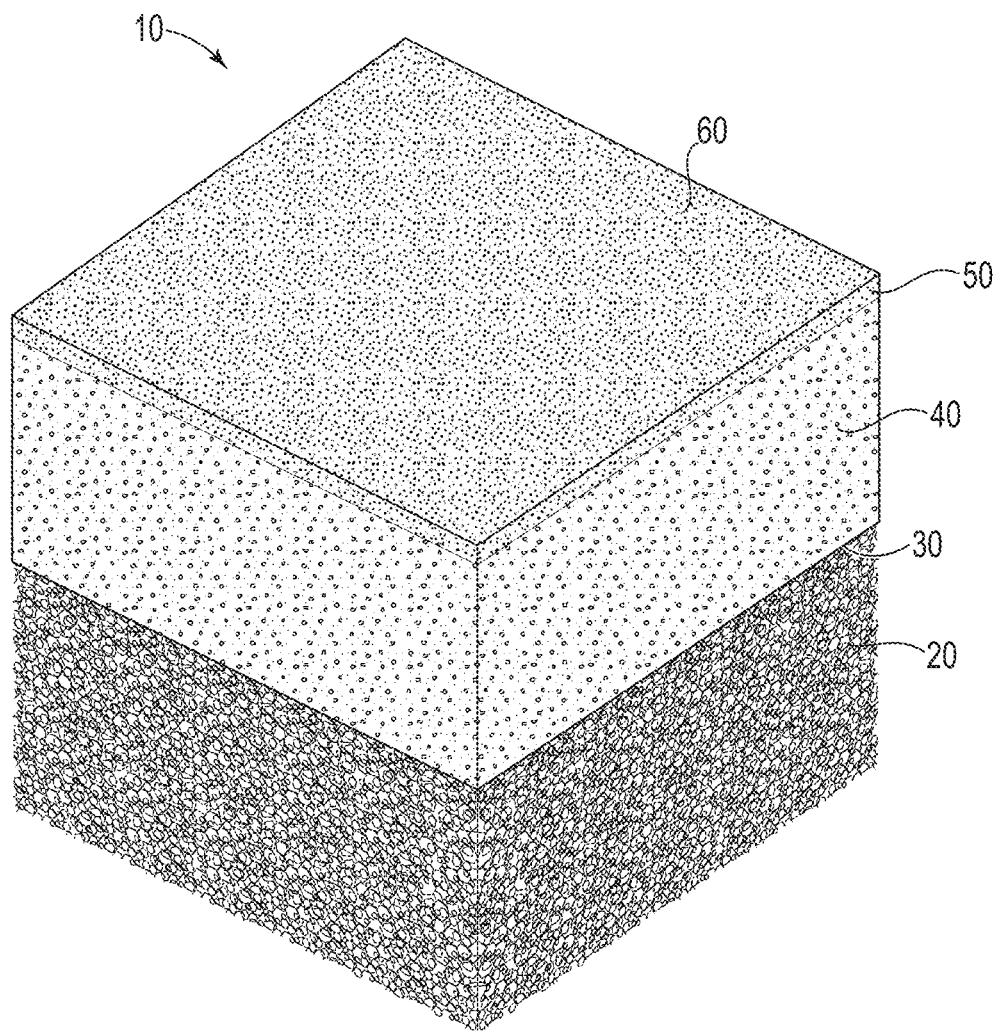

HIGH ASPECT RATIO LAYERED SCRUB

FIELD OF THE DISCLOSURE

This disclosure relates to layered scrubs such as may be used for kitchen, restaurant, bathroom, or industrial cleaning, typically by hand, which include at least a scrubber layer and a sponge layer, and which have a high aspect ratio shape such as a cubic shape.

BACKGROUND OF THE DISCLOSURE

The following references may be relevant to the general field of technology of the present disclosure: US 2016/0213221; U.S. Pat. No. 8,327,493; WO 96/022674; GB 297437; U.S. Pat. Nos. 3,861,993; 4,104,435; 5,799,357; 6,485,822; 6,574,825; 7,124,465; 7,169,029; 8,327,493; 9,221,152; US 2011/0138564; US 2011/0138565; and US 2016/0135934.

SUMMARY OF THE DISCLOSURE

Briefly, the present disclosure provides a layered scrub comprising: a) a scrubber layer; and b) a sponge layer; wherein the layered scrub has an aspect ratio of between 0.75 and 1.25. In some embodiments, the layered scrub has a height of between 5.0 centimeters and 11.0 centimeters. In some embodiments, the layered scrub additionally comprises c) a rigid boundary layer. In some such embodiments, layer a) is directly bound to layer c) and/or layer b) is directly bound to layer c). In some embodiments, the layered scrub additionally comprises d) a dense sponge layer. In some such embodiments, layers d) and b) are unitary. In some such embodiments, dense sponge layer d) bears printed designs or information. In some embodiments, the layered scrub is generally cubic, substantially cubic, and/or essentially cubic. In some embodiments, scrubber layer a) has a thickness equal to 35-65% of the height of the layered scrub. In some embodiments, dense sponge layer d) has a thickness equal to 1.0-15% of the height of the layered scrub. In some embodiments, the scrubber layer comprises a hydrophobic polyurethane foam. In some embodiments, the scrubber layer comprises a non-reticulated foam. In some embodiments, the sponge layer and/or the dense sponge layer comprises a hydrophilic polyurethane foam. In some embodiments, the rigid boundary layer comprises polyurethane. Additional embodiments of the layered scrub of the present disclosure are described below under "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"aspect ratio" of a layered structure comprising generally plane-parallel layers (such as a layered scrub) is the ratio of the height of the structure, measured along an axis orthogonal to the plane of the layers, to the square root of the largest cross-sectional area of the layered structure, measured in the plane of the layers of the layered structure (where a cube has an aspect ratio of 1.0);

"height" of a layered structure comprising generally plane-parallel layers (such as a layered scrub) is measured along an axis orthogonal to the plane of the layers;

"generally cubic" refers to a solid geometric figure that is a rectangular prism having twelve edges and six faces wherein no edge has a length that varies from the average edge length by more than 20%; no face departs from planar in a direction orthogonal to that face (i.e., by surface texture or surface features on the faces) by a distance that is more than 20% of the average edge length; no edge departs from linear in a direction perpendicular to that edge by a distance that is more than 20% of the average edge length; and edges meet at angles of between 70 and 110 degrees; or a solid geometric figure that varies from the preceding in that one or more edges or corners are smoothed, rounded or truncated to a depth of no more than 20% of the length of any edge;

"substantially cubic" refers to a solid geometric figure that is a rectangular prism having twelve edges and six faces wherein no edge has a length that varies from the average edge length by more than 10%; no face departs from planar in a direction orthogonal to the face (i.e, by surface texture or surface features on the faces) by a distance that is more than 10% of the average edge length; no edge departs from linear in a direction perpendicular to the edge by a distance that is more than 10% of the average edge length; and edges meet at angles of between 75 and 105 degrees; or a solid geometric figure that varies from the preceding in that one or more edges or corners are smoothed, rounded or truncated to a depth of no more than 10% of the length of any edge;

"essentially cubic" refers to a solid geometric figure that is a rectangular prism having twelve edges and six faces wherein no edge has a length that varies from the average edge length by more than 5%; no face departs from planar in a direction orthogonal to the face (i.e, by surface texture or surface features on the faces) by a distance that is more than 5% of the average edge length; and no edge departs from linear in a direction perpendicular to the edge by a distance that is more than 5% of the average edge length; and edges meet at angles of between 80 and 100 degrees; or a solid geometric figure that varies from the preceding in that one or more edges or corners are smoothed, rounded or truncated to a depth of no more than 5% of the length of any edge; and "directly bound" refers to two materials that are in direct contact with each other and bound together.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

BRIEF DESCRIPTION OF THE DRAWING

FIG. 1 is an isometric view of one embodiment of a cubic layered scrub according to the present disclosure.

DETAILED DESCRIPTION

The present disclosure provides layered scrubs having an aspect ratio of between 0.75 and 1.25, which in some cases are cubic in shape. The layered scrubs comprise a scrubber layer and a sponge layer. They may additionally comprise a rigid boundary layer between the scrubber layer and sponge layer. They may additionally comprise a dense sponge layer on the top surface of the sponge layer.

FIG. 1 depicts one embodiment of a layered cubic scrub 10 according to the present disclosure. In the depicted embodiment, layered cubic scrub 10 has an aspect ratio of 1.0 and is essentially cubic. In other embodiments a layered cubic scrub may be substantially cubic or generally cubic, as defined above. Layered cubic scrub 10 comprises scrubber layer 20 directly bound to rigid boundary layer 30, which is directly bound to sponge layer 40, which is directly bound to dense sponge layer 50. Since dense sponge layer 50 may be made by modification of a top portion of sponge layer 40, the transition between dense sponge layer 50 may be gradual rather than abrupt. Layered cubic scrub 10 has a top surface 60 which is the top surface of dense sponge layer 50. Top surface 60 may bear printed designs or information (not shown), which may include trademarks, trade dress, written or graphic instructions, bar codes, manufacturing information, and the like. In the depicted embodiment, scrubber layer 20 has a thickness that is about 50% of the total thickness (height) of layered cubic scrub 10. Rigid boundary layer 30 is relatively thin, having a thickness of about 1% of the total thickness (height) of layered cubic scrub 10. Sponge layer 40 has a thickness that is about 40% of the total thickness (height) of layered cubic scrub 10. Dense sponge layer 50 has a thickness that is about 9% of the total thickness (height) of layered cubic scrub 10.

The high aspect ratio or cubic shape may provide several advantages. The scrub typically has a height of between 5.0 centimeters and 11.0 centimeters, and more typically between 6.0 and 9.0 centimeters. This may provide a more ergonomic grip than typical flat (low aspect ratio) scrubs. In general, the greater height and aspect ratio provides a grip more like holding a baseball rather than a rag. This in turn allows the user to bring all or a greater part of one face to bear on a surface to be cleaned for more effective cleaning. This in turn may provide greater longevity for the scrub, since wear is more evenly distributed. The high aspect ratio shape may also provide large side faces. In cubic forms, it provides side faces of approximately equal size to the top and bottom faces. This allows a user to use all six faces for cleaning, rather than just top and bottom faces. This may also provide greater longevity for the scrub, since wear can be more evenly distributed. In embodiments comprising a rigid boundary layer between the scrubber layer and sponge layer, the edge of this rigid boundary layer may be present at the surface of the four side faces and may contribute to effective scrubbing.

The scrubber layer may comprise any suitable open-cell foam material. In some embodiments, the scrubber layer comprises a material selected from polyurethane, polyester, cellulose, and the like. Typically, the scrubber layer comprises polyurethane, more typically a hydrophobic polyurethane foam. Polyurethane foam is preferred over cellulose foam as it provides greatly reduced bacterial growth. In some embodiments, the scrubber layer comprises Pottscorer® 615 obtained from Recticel, Brussels, Belgium. In some embodiments, the scrubber layer comprises a structure of interconnected fibers. The material of the scrubber layer is typically resilient but sufficiently stiff for effective use in removing dirt from a surface to be cleaned. In some embodiments, the material of the scrubber layer may have a porosity of fewer than 10 pores per centimeter, fewer than 8 pores per centimeter, or fewer than 6 pores per centimeter; where the lower pore counts representing increasing pore size. In some embodiments, the material of the scrubber layer is a non-reticulated foam. This large pore structure may allow for greater water holding capacity as well as faster drying. Faster drying may contribute to bacterial resistance. The material of the scrubber layer may have a tensile strength of greater than 193 (28 PSI) and in some embodiments greater than 207 kPa (30 PSI). In some embodiments the material of the scrubber layer may have a tensile strength of 193-276 kPa (28-40 PSI) and in some a tensile strength of 207-248 kPa (30-36 PSI). The material of the scrubber layer may have an ultimate elongation of greater than 120%. Tensile strength and ultimate elongation may be measured as per ISO 1798. The material of the scrubber layer may have a density of less than 38 kg/m$^3$ (0.62 g/in$^3$) and in some embodiments less than 36 kg/m$^3$ (0.59 g/in$^3$). In some embodiments, the material of the scrubber layer has a density of 27-38 kg/m$^3$ (0.45-0.62 g/in$^3$) and in some a density of 32-36 kg/m$^3$ (0.52-0.59 g/in$^3$). Density may be measured as per ISO 845.

The sponge layer may comprise any suitable open-cell foam material. In some embodiments, the sponge layer comprises a material selected from polyurethane, polyester, cellulose, and the like. Typically, the sponge layer comprises polyurethane, more typically a hydrophilic polyurethane foam. Polyurethane foam is preferred over cellulose foam as it provides greatly reduced bacterial growth. In some embodiments, the scrubber layer comprises DryZone obtained from FXI, Media, Pa.

In comparison to the material of the scrubber layer, the material of the sponge layer may have one or more of the following characteristics: less stiffness, smaller pores, greater density, greater compressibility, and less abrasiveness.

The dense sponge layer may comprise any suitable open-cell foam material. In some embodiments, the dense sponge layer comprises a material selected from polyurethane, polyester, cellulose, or the like. Typically, the dense sponge layer comprises polyurethane, more typically a hydrophilic polyurethane foam. Polyurethane foam is preferred over cellulose foam as it provides greatly reduced bacterial growth.

In comparison to the material of the sponge layer, the material of the dense sponge layer may have one or more of the following characteristics: smaller pores, fewer pores, greater density, and reduced compressibility. This dense sponge layer may increase longevity of the scrub in use.

Typically, the dense sponge layer comprises the same material as the sponge layer, however at a higher density. In some embodiments, the dense sponge layer is formed by modification of a top portion of the sponge layer. Any suitable method may be used to modify a top portion of the sponge layer to form a dense sponge layer. In one embodiment, a kiss felting treatment is used. In this method, the sponge layer material is pressed against a heated plate to create the dense sponge layer. In such embodiments, the sponge layer and dense sponge layer are unitary, that is, formed in combination from a single material rather than assembled from different materials.

In some embodiments, the sponge layer and dense sponge layer may comprise separate materials bound together using an adhesive. Any suitable adhesive may be used, which may include epoxy adhesives, polyurethane adhesives, hot melt adhesives, and the like. Typically the adhesive dries, cools, or cures to a water-insoluble bond.

In some embodiments, the presence of a dense sponge layer provides a top surface with improved printability, due to its higher density, fewer and/or smaller pores, and/or the closing of pores at the surface to form a more continuous surface. The dense sponge layer may bear printed designs or information which may include trademarks, trade dress, written or graphic instructions, bar codes, manufacturing information, and the like. Printing on the dense sponge layer may be accomplished by any suitable method, which may include contact methods such as flexographic printing, screen printing, or gravure printing, or non-contact methods such as inkjet printing.

The rigid boundary layer may comprise any suitable material. Typically, the rigid boundary layer comprises the same material as the sponge layer or the scrubber layer or a mixture of the materials of the materials of the sponge layer and scrubber layer. In some embodiments, the rigid boundary layer comprises a material selected from polyurethane, polyester, cellulose, and the like. Typically, the rigid boundary layer comprises polyurethane. The material of the rigid boundary layer may have few or no pores.

In some embodiments, the rigid boundary layer is formed concurrently with the process of binding together the scrubber layer and sponge layer. In some embodiments, this is accomplished by application of heat to soften the materials of one or both of the scrubber layer and the sponge layer followed by joining the layers. In some embodiments, this is accomplished by flame lamination. In general, flame lamination involves passing a substrate such as a polyurethane foam through a controlled flame to change the surface of the foam to a softened or molten state. Another substrate is then brought into direct contact with the molten foam at a nip point under controlled tension and pressure. As the molten foam rapidly cools, a cohesive bond is formed at the interface between the two materials. This bond may form the rigid boundary layer.

In some embodiments, the scrubber layer and sponge layer are bound together using an adhesive. Any suitable adhesive may be used, which may include epoxy adhesives, polyurethane adhesives, hot melt adhesives, and the like. Typically the adhesive dries, cools, or cures to a water-insoluble bond. The adhesive bond may form a rigid boundary layer, or, in some such embodiments, no rigid boundary layer may be included.

Additional embodiments are recited in the Selected Embodiments below.

Selected Embodiments

The following embodiments, designated by letter and number, are intended to further illustrate the present disclosure but should not be construed to unduly limit this disclosure.

LS1. A layered scrub comprising:
  a) a scrubber layer; and
  b) a sponge layer;
wherein the layered scrub has an aspect ratio of between 0.75 and 1.25.

LS2. The layered scrub according to embodiment LS1, additionally comprising:
  c) a rigid boundary layer.

LS3. The layered scrub according to embodiment LS2 wherein layer a) is directly bound to layer c).

LS4. The layered scrub according to embodiment LS2 or LS3 wherein layer b) is directly bound to layer c).

LS5. The layered scrub according to any of the preceding embodiments, additionally comprising:
  d) a dense sponge layer.

LS6. The layered scrub according to embodiment LS5, wherein layer d) is directly bound to layer b).

LS7. The layered scrub according to embodiment LS5 or LS6, wherein layers d) and b) are unitary.

LS8. The layered scrub according to any of embodiments LS5-LS7 wherein layer d) bears printed designs or information.

LS9. The layered scrub according to embodiment LS8 wherein the printed designs or information include one or more of: trademarks, trade dress, written or graphic instructions, bar codes, or manufacturing information.

LS10. The layered scrub according to any of the preceding embodiments, wherein the layered scrub has an aspect ratio of at least 0.80.

LS11. The layered scrub according to any of the preceding embodiments, wherein the layered scrub has an aspect ratio of at least 0.85.

LS12. The layered scrub according to any of the preceding embodiments, wherein the layered scrub has an aspect ratio of at least 0.90.

LS13. The layered scrub according to any of the preceding embodiments, wherein the layered scrub has an aspect ratio of at least 0.95.

LS14. The layered scrub according to any of the preceding embodiments, wherein the layered scrub has an aspect ratio of not more than 1.20.

LS15. The layered scrub according to any of the preceding embodiments, wherein the layered scrub has an aspect ratio of not more than 1.15.

LS16. The layered scrub according to any of the preceding embodiments, wherein the layered scrub has an aspect ratio of not more than 1.10.

LS17. The layered scrub according to any of the preceding embodiments, wherein the layered scrub has an aspect ratio of not more than 1.05.

LS18. The layered scrub according to any of the preceding embodiments having a height of between 5.0 centimeters and 11.0 centimeters.

LS19. The layered scrub according to any of the preceding embodiments, wherein the layered scrub has a height of at least 6.0 centimeters.

LS20. The layered scrub according to any of the preceding embodiments, wherein the layered scrub has a height of at least 6.5 centimeters.

LS21. The layered scrub according to any of the preceding embodiments, wherein the layered scrub has a height of at least 7.0 centimeters.

LS22. The layered scrub according to any of the preceding embodiments, wherein the layered scrub has a height of not more than 10.0 centimeters.

LS23. The layered scrub according to any of the preceding embodiments, wherein the layered scrub has a height of not more than 9.0 centimeters.

LS24. The layered scrub according to any of the preceding embodiments, wherein the layered scrub has a height of not more than 8.0 centimeters.

LS25. The layered scrub according to any of the preceding embodiments, wherein the layered scrub has a height of not more than 7.5 centimeters.

LS26. The layered scrub according to any of the preceding embodiments, wherein the layered scrub is generally cubic.

LS27. The layered scrub according to any of the preceding embodiments, wherein the layered scrub is substantially cubic.

LS28. The layered scrub according to any of the preceding embodiments, wherein the layered scrub is essentially cubic.

LS29. The layered scrub according to any of the preceding embodiments, wherein the layered scrub has a height and the scrubber layer has a thickness equal to 35-65% of the height of the layered scrub.

LS30. The layered scrub according to any of the preceding embodiments, wherein the layered scrub has a height and the scrubber layer has a thickness equal to 40-60% of the height of the layered scrub.

LS31. The layered scrub according to any of the preceding embodiments, wherein the layered scrub has a height and the scrubber layer has a thickness equal to 45-55% of the height of the layered scrub.

LS32. The layered scrub according to any of the preceding embodiments, wherein the layered scrub has a height and the sponge layer has a thickness equal to 30-65% of the height of the layered scrub.

LS33. The layered scrub according to any of the preceding embodiments, wherein the layered scrub has a height and the sponge layer has a thickness equal to 35-60% of the height of the layered scrub.

LS34. The layered scrub according to any of the preceding embodiments, wherein the layered scrub has a height and the sponge layer has a thickness equal to 40-55% of the height of the layered scrub.

LS35. The layered scrub according to any of the preceding embodiments, wherein the layered scrub has a height and the layered scrub comprises a rigid boundary layer having a thickness equal to 0.1-5.0% of the height of the layered scrub.

LS36. The layered scrub according to any of the preceding embodiments, wherein the layered scrub has a height and the layered scrub comprises a rigid boundary layer having a thickness of not more than 1.0% of the height of the layered scrub.

LS37. The layered scrub according to any of the preceding embodiments, wherein the layered scrub has a height and the layered scrub comprises a dense sponge layer having a thickness equal to 1.0-15% of the height of the layered scrub.

LS38. The layered scrub according to any of the preceding embodiments, wherein the layered scrub has a height and the layered scrub comprises a dense sponge layer having a thickness equal to 6.0-12% of the height of the layered scrub.

LM1. The layered scrub according to any of the preceding embodiments, wherein the scrubber layer comprises a hydrophobic polyurethane foam.

LM2. The layered scrub according to any of the preceding embodiments, wherein the scrubber layer comprises a non-reticulated foam.

LM3. The layered scrub according to any of the preceding embodiments, wherein the scrubber layer has an average porosity of less than 10 pores per centimeter.

LM4. The layered scrub according to any of the preceding embodiments, wherein the scrubber layer has an average porosity of less than 6 pores per centimeter.

LM5. The layered scrub according to any of the preceding embodiments, wherein the scrubber layer has a tensile strength of greater than 193 (28 PSI)

LM6. The layered scrub according to any of the preceding embodiments, wherein the scrubber layer has a tensile strength of greater than 207 kPa (30 PSI).

LM7. The layered scrub according to any of the preceding embodiments, wherein the scrubber layer has a density of less than 38 kg/m$^3$ (0.62 g/in$^3$).

LM8. The layered scrub according to any of the preceding embodiments, wherein the scrubber layer has a density of less than 36 kg/m$^3$ (0.59 g/in$^3$).

LM9. The layered scrub according to any of the preceding embodiments, wherein the sponge layer comprises a hydrophilic polyurethane foam.

LM10. The layered scrub according to any of the preceding embodiments, wherein the scrubber layer comprises a first material and the sponge layer comprises a second material and the first material is stiffer than the second material.

LM11. The layered scrub according to any of the preceding embodiments, wherein the scrubber layer comprises a first foam material and the sponge layer comprises a second foam material and the first foam material has a larger average pore size than the second material.

LM12. The layered scrub according to any of the preceding embodiments, wherein the scrubber layer comprises a first material and the sponge layer comprises a second material and the first material has a lesser density than the second material.

LM13. The layered scrub according to any of the preceding embodiments, wherein the scrubber layer comprises a first material and the sponge layer comprises a second material and the first material has a lesser compressibility than the second material.

LM14. The layered scrub according to any of the preceding embodiments, wherein the scrubber layer comprises a first material and the sponge layer comprises a second material and the first material is more abrasive than the second material.

LM15. The layered scrub according to any of the preceding embodiments, additionally comprising:
  c) a rigid boundary layer;
wherein the rigid boundary layer comprises polyurethane.

LM16. The layered scrub according to any of the preceding embodiments, additionally comprising:
  c) a rigid boundary layer;
wherein the rigid boundary layer comprises a non-porous material.

LM17. The layered scrub according to any of the preceding embodiments, additionally comprising:
  d) a dense sponge layer;
wherein the dense sponge layer comprises a hydrophilic polyurethane foam.

LM18. The layered scrub according to any of the preceding embodiments, wherein the sponge layer comprises a second foam material and the dense sponge layer comprises a third foam material and the second foam material has a larger average pore size than the third foam material.

LM19. The layered scrub according to any of the preceding embodiments, wherein the sponge layer comprises a second foam material and the dense sponge layer comprises a third foam material and the second foam material has more pores per volume than the third foam material.

LM20. The layered scrub according to any of the preceding embodiments, wherein the sponge layer comprises a second material and the dense sponge layer comprises a third material and the second material has a lesser density than the third material.

LM21. The layered scrub according to any of the preceding embodiments, wherein the sponge layer comprises a second material and the dense sponge layer comprises a third material and the second material has a greater compressibility than the third material.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A layered scrub comprising:
   a) a scrubber layer which comprises a hydrophobic polyurethane foam;
   b) a sponge layer;
   c) a rigid boundary layer; and
   d) a dense sponge layer;
   wherein the dense sponge layer and the sponge layer are unitary; and
   wherein the layered scrub has an aspect ratio of between 0.75 and 1.25.

2. The layered scrub according to claim 1 wherein the scrubber layer is directly bound to the rigid boundary layer and the sponge layer is directly bound to the rigid boundary layer.

3. The layered scrub according to claim 1 wherein the dense sponge layer bears printed designs or information.

4. The layered scrub according to claim 1, wherein the layered scrub has an aspect ratio of at least 0.90.

5. The layered scrub according to claim 1, wherein the layered scrub has an aspect ratio of not more than 1.10.

6. The layered scrub according to claim 1 having a height of between 5.0 centimeters and 11.0 centimeters.

7. The layered scrub according to claim 1, wherein the layered scrub is generally cubic.

8. The layered scrub according to claim 1, wherein the layered scrub is substantially cubic.

9. The layered scrub according to claim 1, wherein the layered scrub has a height and the scrubber layer has a thickness equal to 35-65% of the height of the layered scrub.

10. The layered scrub according to claim 1, wherein the layered scrub has a height and the dense sponge layer has a thickness equal to 1.0-15% of the height of the layered scrub.

11. The layered scrub according to claim 1, wherein the sponge layer comprises a hydrophilic polyurethane foam.

12. The layered scrub according to claim 1, wherein the rigid boundary layer comprises polyurethane.

13. The layered scrub according to claim 1, wherein the dense sponge layer comprises a hydrophilic polyurethane foam.

14. The layered scrub according to claim 1 wherein the rigid boundary layer has a thickness equal to 0.1-5.0% of the height of the layered scrub.

15. A layered scrub comprising:
   a) a scrubber layer which comprises a hydrophobic polyurethane foam; and
   b) a sponge layer;
   wherein the layered scrub has an aspect ratio of between 0.75 and 1.25;
   the layered scrub additionally comprising:
   d) a dense sponge layer;
   wherein the dense sponge layer and the sponge layer are unitary.

16. The layered scrub according to claim 15, wherein the transition between the sponge layer and the dense sponge layer is gradual rather than abrupt.

17. The layered scrub according to claim 15 wherein the dense sponge layer bears printed designs or information.

* * * * *